Jan. 14, 1930.  A. ST. C. DUNSTAN  1,743,959
HYDRAULIC SHOCK ABSORBER
Filed March 29, 1928  2 Sheets-Sheet 1
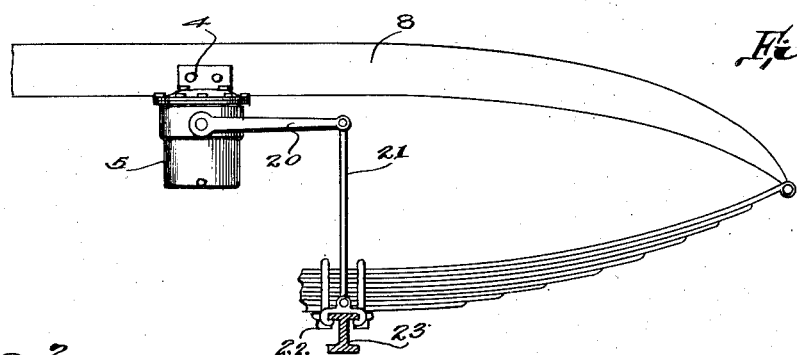
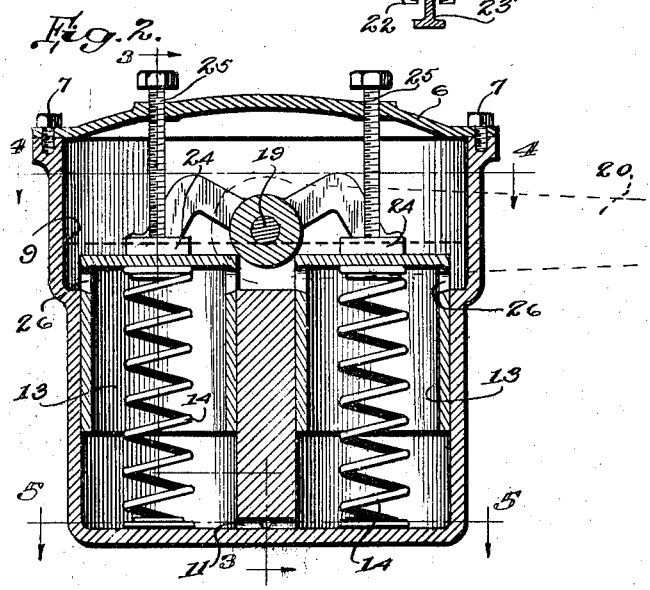
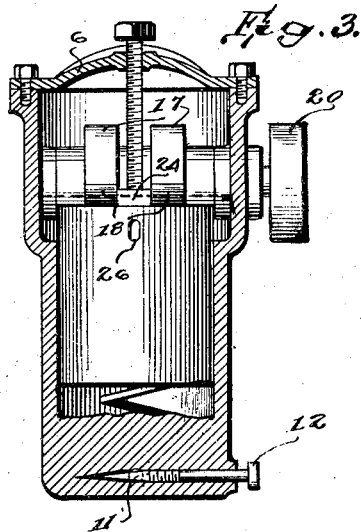
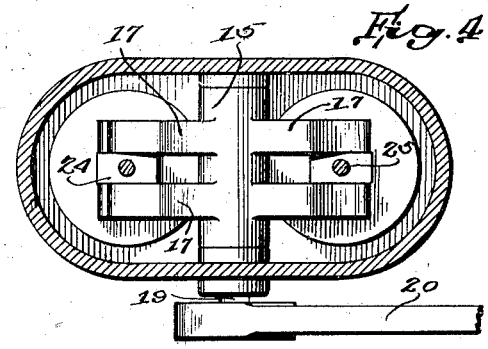
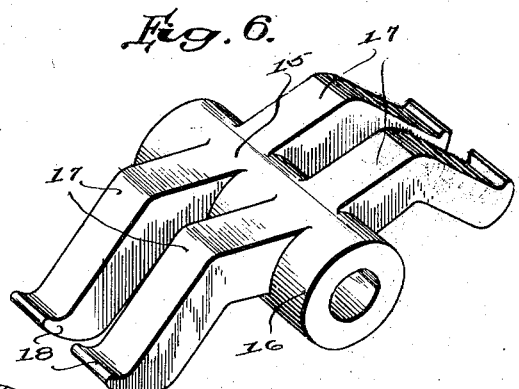
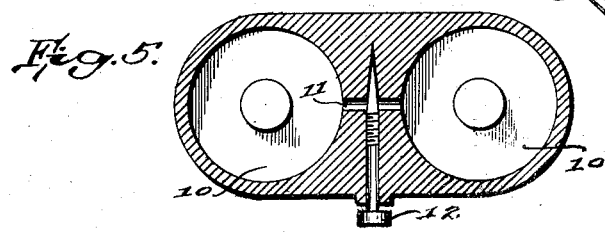
INVENTOR
A. St C. DUNSTAN
BY
ATTORNEY Jan. 14, 1930.  A. ST. C. DUNSTAN  1,743,959
HYDRAULIC SHOCK ABSORBER
Filed March 29, 1928    2 Sheets-Sheet 2
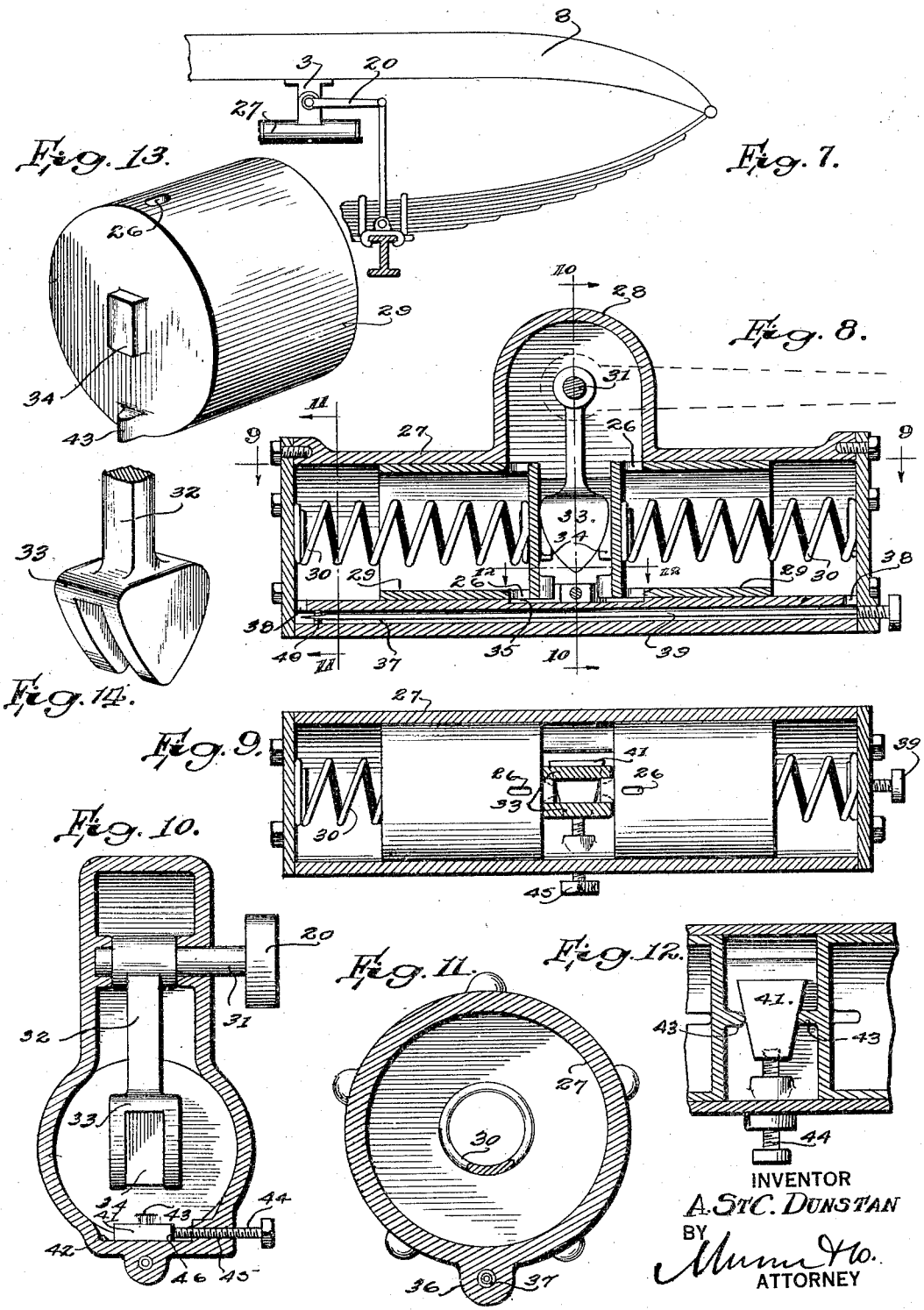
INVENTOR
A.S'rC. Dunstan
BY
ATTORNEY Patented Jan. 14, 1930

1,743,959

UNITED STATES PATENT OFFICE

ARTHUR ST. CHARLES DUNSTAN, OF AUBURN, ALABAMA

HYDRAULIC SHOCK ABSORBER

Application filed March 29, 1928. Serial No. 265,637.

My invention relates to hydraulic shock absorbers for automobiles and an object of the invention is to provide a shock absorber which possesses a maximum amount of shock absorbing qualities, allows any desired rate of shock absorption to be attained, and at the same time will reduce the loss of the oil or other hydraulic medium to a minimum.

Further the invention contemplates a hydraulic shock absorber embodying a plurality of fluid resisted pistons and a rocking member operatively connected with the usual suspension spring of an automobile and movable against the pistons to check or absorb shocks transmitted to the automobile.

The invention further provides a hydraulic shock absorber wherein the displaced fluid is initially permitted to flow gradually through the pistons when they are depressed so as to cushion gradually the shock or rebound.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a side elevation of the invention associated with an automobile under-structure;

Figure 2 is an enlarged vertical sectional view of the invention;

Figure 3 is a vertical section taken on line 3—3 of Figure 2;

Figure 4 is a horizontal section taken on line 4—4 of Figure 2;

Figure 5 is a similar view taken on line 5—5 of Figure 2;

Figure 6 is a perspective of the piston depressing element embodied in the invention;

Figure 7 is a view similar to Figure 1 of a modified embodiment of the invention;

Figure 8 is an enlarged vertical longitudinal sectional view of the same;

Figure 9 is a longitudinal sectional view taken on line 9—9 of Figure 8;

Figure 10 is a vertical section taken on line 10—10 of Figure 8;

Figure 11 is a similar view taken on line 11—11 of Figure 8;

Figure 12 is a fragmentary horizontal section taken on line 12—12 of Figure 8;

Figure 13 is a perspective of one of the fluid resisted pistons; and

Figure 14 is a fragmentary perspective of the piston depressing element embodied in the construction disclosed in Figure 8.

Referring to the invention in detail, and particularly to the construction disclosed in Figures 1 to 6 inclusive, a cylindrical casing 5 having a removable top cover plate 6 held by removable fastenings 7, is attached to the one face of one of the chassis side bars 8 of a conventional automobile, by means of a bracket 4.

As illustrated in Figure 2, the casing 5 is formed with an enlarged fluid chamber 9 at its upper end while from a point below the chamber 9 the casing is formed with a pair of parallel bores or piston chambers 10 having communication at their lower ends by a transverse by-pass 11. A needle valve 12 extends transversely across the lower end of the casing and by-pass 11 to regulate the passage of oil or other hydraulic medium from one piston chamber to the other.

A piston 13 closed at its upper end is movable vertically in each of the piston chambers and is normally urged in an upward direction by expansible coil springs 14 interposed between the end walls of the pistons and the bottom walls of the casing.

In practice the casing is filled with a hydraulic medium to the level indicated in the broken line in Figure 2, and in order to depress the pistons against the hydraulic medium, a rocking piston depressing member 15 is provided. This piston depressing member comprises a sleeve 16 formed with pairs of parallel laterally extending inverted V-shaped arms 17 terminating in rounded feet 18. The sleeve 16 is received on and fixed to rotate with a rock shaft 19, extending transversely of the chamber 9 at a point between the piston chambers and journalled in the walls of the casing. The arms 17 extend to points where their rounded feet engage the end walls of the pistons so that upon rocking of the rock shaft one or the other of the pistons will be depressed against the hydraulic medium and corresponding spring 14.

One end of the rock shaft projects laterally from the casing and carries a normally horizontally disposed lever 20 having one end pivotally connected with a vertically disposed link 21 carrying a pivoted clamp 22 at its lower end, which is engaged with the usual resiliently mounted axle 23 of an automobile under-structure. For the purpose of holding the pistons against rotation, the upper face of the end wall of each piston is provided with a centrally disposed rectangular boss 24, each of which is straddled by one pair of the feet 18. As illustrated particularly in Figures 3 and 4 these feet abut the vertical faces of the bosses and thus hold the pistons against rotation.

In order to permit the vehicle springs to flex, incident to the usual ripples in a roadway, without actuating the shock absorbing pistons, vertically arranged adjusting screws are threaded through the closure 6 above these pistons and have their lower ends engaged with the rectangular bosses. By adjustment of these screws the pistons will be raised or lowered to predetermined heights so that the feet 18 will only engage the pistons after the vehicle springs have flexed beyond a predetermined degree.

For the purpose of preventing sudden impact by the pistons against the hydraulic medium, and thus cause the pistons to be depressed gradually, pairs of diametrically opposed tapered ports 26 are provided in the upper end of each of the pistons. These ports are arranged with their largest ends opening upon the interior of the pistons and are normally disposed above the upper ends of the piston chambers. As the pistons are depressed the hydraulic medium will be initially forced outward through these openings, but as the pistons lower these openings will be gradually closed by the walls of the casing.

In the operation of the device the lever 20 is raised and lowered with the rise and fall of the axle to rock the rock shaft. The rock shaft in turn causes the arm 17 to rock and alternately depress the pistons against the expansible springs. As one piston is depressed the hydraulic medium from one piston chamber is forced into the other through the by-pass 11. Thus as the hydraulic medium is displaced from one piston chamber it entirely fills the other.

In Figures 7 to 14 inclusive a modification of the invention is illustrated. In this construction a horizontally disposed cylinder 27 having a laterally rounded chamber 28 upon its upper face is provided, the cylinder being supported from the chassis frame member 8 by a bracket 3. A pair of opposed pistons 29 is arranged in the cylinder, and interposed between the end wall of each of the pistons and the adjacent end of the cylinder is an expansible coil spring 30. A horizontally disposed rock shaft 31 is journalled in the side walls of the chamber 28, to the outer end of which a lever 20 is connected. An oscillatory arm 32 is formed with the rock shaft and extends downwardly between the opposed pistons and terminates in a bifurcated arrow-head shaped member 33. Rectangular bosses 34 are cast upon the opposed faces of the end walls of the pistons and are received between the bifurcated parts of the member 33 and thereby serve to hold the pistons against rotation. A longitudinally extending by-pass 35 is provided in the inner face of the lower cylinder wall, intermediate its ends, to normally establish communication between the adjacent ports 26 in the pistons.

A lateral enlargement 36, extending the entire length of the end face of the cylinder and having a longitudinal bore 37 therein is provided, the bore communicating with ports 38 leading into the interior of the cylinder at its ends. A needle valve 39 is positioned in the bore and cooperates with a valve seat 40 at one end thereof in controlling the passage of the hydraulic medium from the cylinder to the bore.

For the purpose of limiting the movement of the pistons towards each other, a tapered adjusting block 41 is adjustable horizontally between the pistons in a depression 42 in the bottom wall of the cylinder and is normally engaged by lateral lugs 43 formed upon the end walls of the pistons. The block is adjustable transversely of the cylinder by means of an adjusting screw 44 threadedly engaged within a transverse bore 45 in the cylinder and swivelled to the block, as at 46.

In the operation of this form of the invention the pistons are alternately pushed longitudinally against the hydraulic medium by means of the bifurcated head, which is oscillated incident to the rocking of the rock shaft. As the pistons are actuated against the expansible springs, the hydraulic medium is forced from one end of the cylinder and into the other by way of the bore 37.

What is claimed is:—

1. In a shock absorber, a fluid receiving casing having piston chambers therein, a piston in each chamber and resiliently urged in one direction, a rocking element journalled between the pistons adapted to have operated connection with a movable part of an automobile, pairs of parallel arms extending laterally from opposite sides of the rocking element and engaging the pistons whereby to alternately depress the latter against the fluid upon flexing of such automobile part, and a boss carried by each piston and disposed between each pair of arms to hold the pistons against rotation.

2. In a shock absorber, a fluid receiving casing having piston chambers therein, a piston in each chamber and resiliently urged in one direction, a rocking element journalled between the pistons adapted to have operative connection with a movable part of an automobile, pairs of parallel arms extending laterally from opposite sides of the rocking element and engaging the pistons whereby to alternately depress the latter against the fluid upon flexing of such automobile part, a boss carried by each piston and disposed between each pair of arms to hold the pistons against rotation, and longitudinally adjustable stops opposed to the pistons and normally engaged by the bosses.

3. In a shock absorber, a casing for attachment to a fixed part of an automobile, a pair of yieldably mounted pistons arranged therein, a rocking member journalled in the casing for operative connection with an automobile spring and having laterally extending legs engageable with the pistons upon actuation of the rocking member, and adjusting screws passing through the casing and engaging the pistons and operable to vary the position of the latter whereby to permit the rocking member to rock a predetermined distance before engaging the pistons.

Signed at Auburn in the county of Lee and State of Alabama this 12th day of March A. D. 1928.

A. ST. C. DUNSTAN.